United States Patent
Li et al.

(10) Patent No.: US 6,446,180 B2
(45) Date of Patent: Sep. 3, 2002

(54) MEMORY DEVICE WITH SYNCHRONIZED OUTPUT PATH

(75) Inventors: Wen Li; Christopher K. Morzano, both of Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/918,276

(22) Filed: Jul. 30, 2001

Related U.S. Application Data

(63) Continuation of application No. 09/356,924, filed on Jul. 19, 1999, now abandoned.

(51) Int. Cl.[7] .............................. G06F 12/00; G06F 1/04; G11C 8/00
(52) U.S. Cl. ...................... 711/167; 713/401; 713/600; 365/194; 365/233; 327/147; 327/156
(58) Field of Search .......................... 365/194, 189.05, 365/230.02, 230.03, 230.08, 233; 713/400, 401, 502–503, 600, 500; 711/167, 105; 327/147, 149, 156, 158, 161

(56) References Cited

U.S. PATENT DOCUMENTS 5,917,760 A * 6/1999 Millar ........................ 365/194
6,029,250 A * 2/2000 Keeth ........................ 713/400
6,115,318 A * 9/2000 Keeth ........................ 365/233

* cited by examiner

*Primary Examiner*—Matthew Kim
*Assistant Examiner*—Denise Tran
(74) *Attorney, Agent, or Firm*—Williams, Morgan & Amerson, PC

(57) ABSTRACT

A memory device includes a data array, array control logic, a delay locked loop circuit, timing control logic, and a first storage device. The array control logic is adapted to receive a read command synchronized with an external clock signal and to read at least a first data element from the data array based on the read command. The delay locked loop circuit is adapted to receive the external clock signal and delay the external clock signal by a programmable amount to generate a delay locked loop clock signal. The timing control logic is adapted to generate a first input enable signal based on the external clock signal and a first output enable signal based on the delay locked loop clock signal. The first storage device adapted to receive the first data element. The first storage device has an input terminal enabled in response to the first input enable signal and an output terminal enabled in response to the first output enable signal.

62 Claims, 5 Drawing Sheets

MEMORY DEVICE WITH SYNCHRONIZED OUTPUT PATH

This is a Continuation of co-pending application Ser. No. 09/356,924 filed Jul. 19, 1999, now abandoned.

BACKGROUND OF THE INVENTION

1. Field of the Invention

This invention relates generally to synchronous memory devices, and, more particularly, to a synchronous memory device adapted to receive input data and provide output data synchronized with a common external clock signal.

2. Description of the Related Art

Memory devices, such as synchronous dynamic random access memories (SDRAM) have been widely used to enhance the performance of computer systems executing memory intensive applications. Synchronous memory devices receive and deliver data coincident with a clock signal. In previous SDRAM devices, an external clock signal is received by the device. Input signals and data are received synchronized with the external clock signal. Due to internal delays associated with the components of the memory device, the phase of the external clock signal is shifted within the memory device, such the output data delivered from the device is no longer exactly aligned with the external clock signal. A typical SDRAM can read or write data on the rising edge of a clock cycle. The phase difference between the external clock signal and the data clock signal is less than one clock cycle (e.g., 5 ns), so the output data may be received prior to the next rising edge of the external clock signal.

To increase the bandwidth of memory devices, it has been proposed to receive data and provide output data on both the rising and falling edges of the clock signal. In such an arrangement, the phase delay in the external clock signal produced by the memory device becomes problematic. If output data were to be delivered on both the rising and falling edges in the manner used for present SDRAM devices (i.e., using a delayed data clock signal), the falling edge data is valid during the subsequent rising edge of the external clock signal. Such an arrangement generates timing problems for other devices accessing the memory device.

The present invention is directed to overcoming, or at least reducing the effects of, one or more of the problems set forth above.

SUMMARY OF THE INVENTION

One aspect of the present invention is seen in a memory device including a data array, array control logic, a delay locked loop circuit, timing control logic, and a first storage device. The array control logic is adapted to receive a read command synchronized with an external clock signal and to read at least a first data element from the data array based on the read command. The delay locked loop circuit is adapted to receive the external clock signal and delay the external clock signal by a programmable amount to generate a delay locked loop clock signal. The timing control logic is adapted to generate a first input enable signal based on the external clock signal and a first output enable signal based on the delay locked loop clock signal. The first storage device adapted to receive the first data element. The first storage device has an input terminal enabled in response to the first input enable signal and an output terminal enabled in response to the first output enable signal.

Another aspect of the present invention is seen in a method for accessing a memory device. A read command is received synchronized with an external clock signal. A data array is accessed to read at least a first data element from the data array based on the read command. The external clock signal is delayed by a programmable amount to generate a delay locked loop clock signal. A first input enable signal is generated based on the external clock signal and a first output enable signal based on the delay locked loop clock signal. The first data element is stored in a first data storage device in response to the first input enable signal and output from the first data storage device in response to the first output enable signal.

BRIEF DESCRIPTION OF THE DRAWINGS

The invention may be best understood by reference to the following description taken in conjunction with the accompanying drawings, in which like reference numerals identify like elements, and in which.

Figure 1:
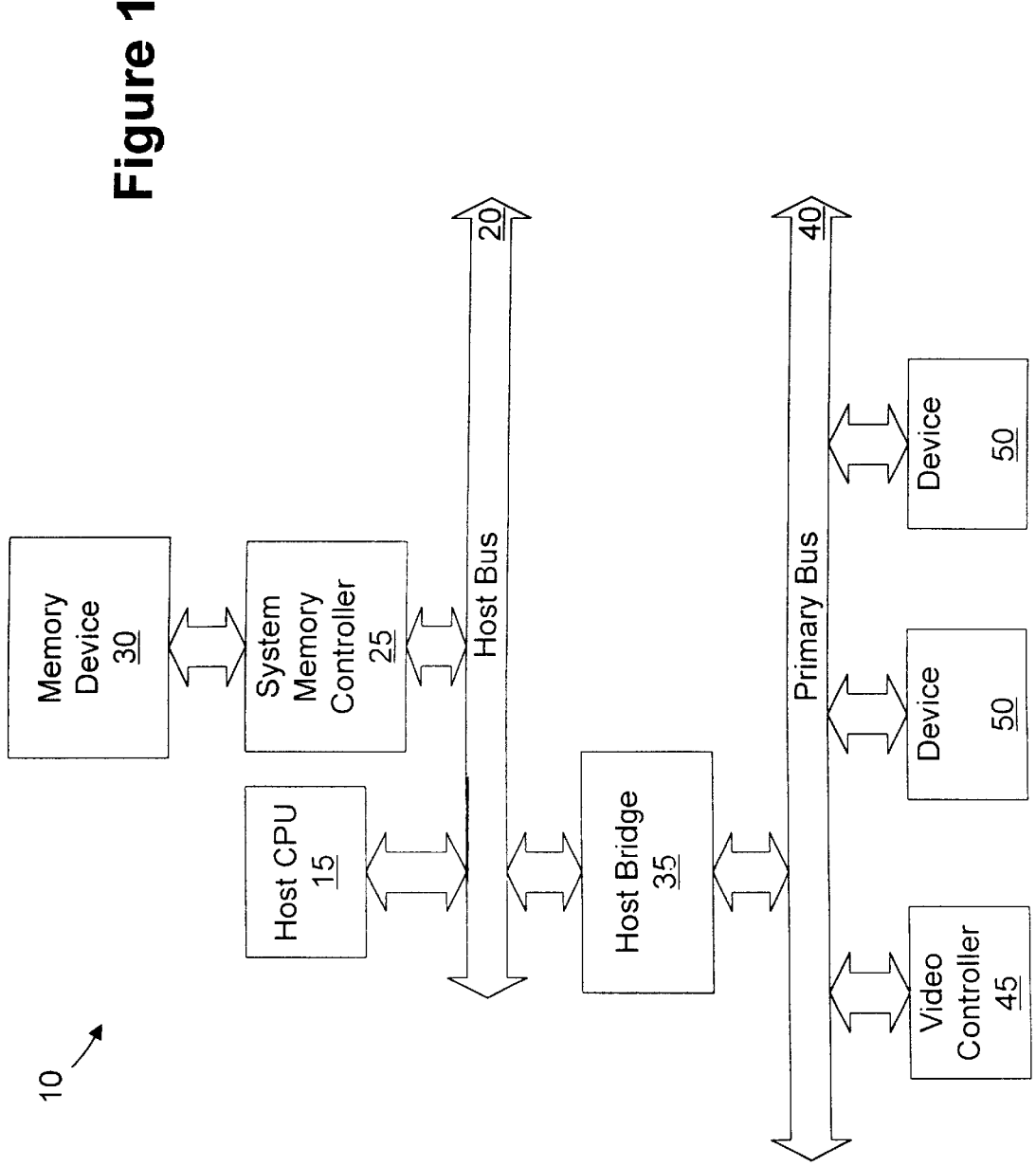
FIG. 1 is a simplified block diagram of a computer system in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1, a simplified block diagram of a computer system 10 is provided. The computer system 10 includes a microprocessor 15, which may include multiple processors (not shown) coupled to a host bus 20. A system memory controller 25 is coupled to the host bus and a memory device 30. A host bridge 35 couples the host bus 20 to a primary bus 40, such as a peripheral component interconnect (PCI) bus (PCI Specification, Rev. 2.1). A video controller 45 and other devices 50 (e.g., PCI devices) are coupled to the primary bus 40. The computer system 10 may include other buses such as a secondary PCI bus (not shown) or other peripheral devices (not shown) known in the art.

The microprocessor 15 communicates with the memory device 30 through the system memory controller 25. The system memory controller 25 provides memory addresses and logic signals to the memory device 30 to characterize the desired memory transactions. In the illustrated embodiment, the memory device 30 is a synchronous dynamic random access memory (SDRAM) having the ability to deliver output data on both the rising and the falling edges of the clock signal (i.e., double data rate). Although the present invention is described in reference to an SDRAM, its application is not so limited. In light of the disclosure herein, the present invention may be adapted for use with other types of memory devices (not shown).

Figure 2:
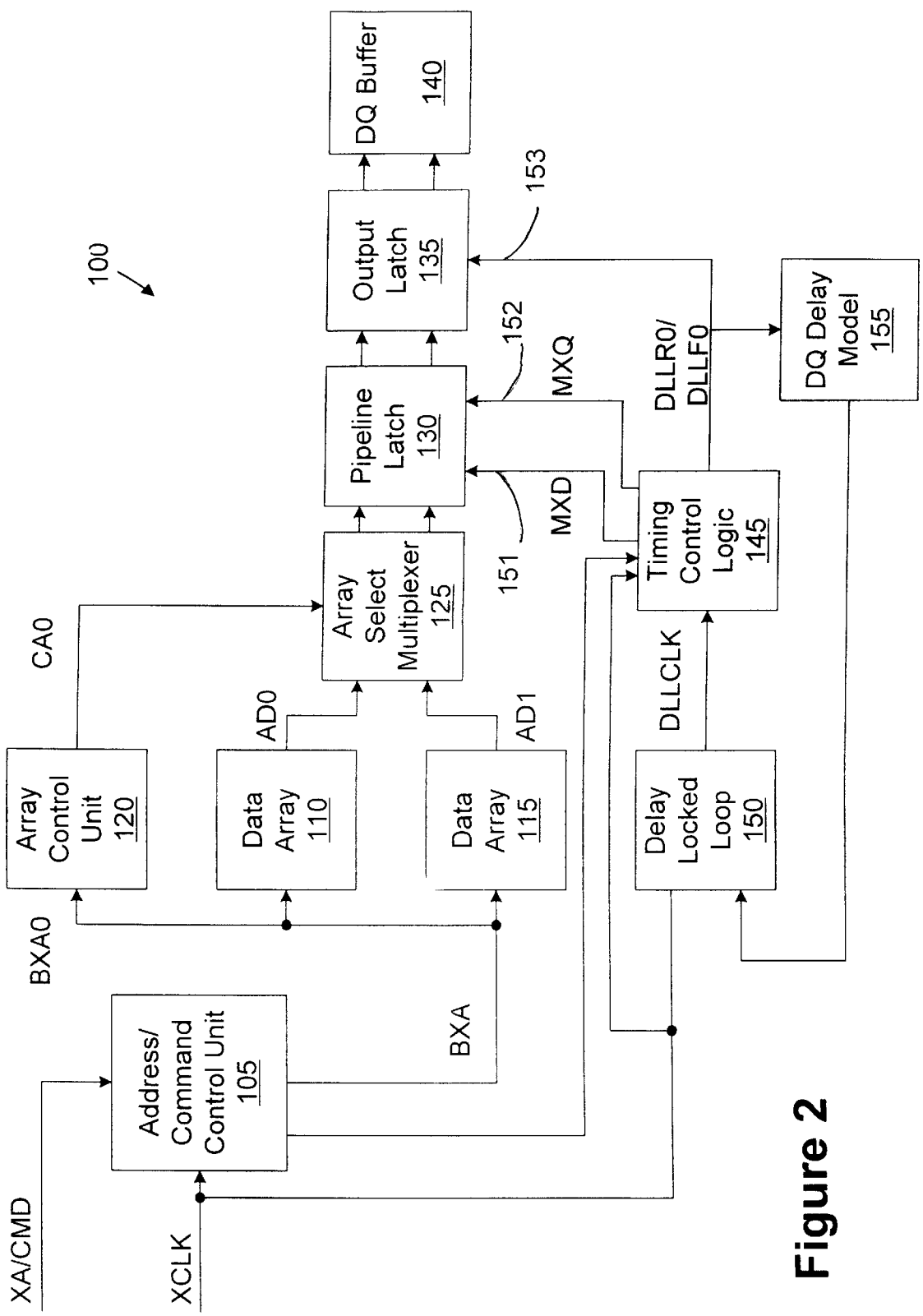
FIG. 2 is a simplified block diagram of a data output path of a memory device in the computer system of FIG. 1.

FIG. 2 illustrates a simplified block diagram of a data output path 100 of the memory device 30. For clarity, only the functional units useful in supporting the data output path 100 are illustrated. The memory device 30 includes an address/command control unit 105 that receives an external clock signal (i.e., XCLK), address signals (i.e., XA), and command signals (i.e., CMD). As used herein, the "#" character is used to denote a logic signal that is asserted in its logically low state. In the illustrated embodiment, the command signals include a column address select signal (CAS#), a row address select signal (RAS#), a write enable signal (WE#), chip select signal (CS#), and a clock enable signal (CKE). The use of these command signals to operate the memory device 30 is generally known to those of ordinary skill in the art, and, for clarity, they are not discussed in greater detail hereinafter.

The address/command control unit 105 includes two data arrays 110, 115 accessible by the address/command control unit 105. It is contemplated that a different number of data arrays 110, 115 may be used depending on the specific application. To access the data arrays 110, 115, the address/command control unit 105 provides a bank column address (BXA) to the data arrays 110, 115. The least significant bit (LSB) of the bank column address (BXA0) is provided to an array control unit 120. The control unit 120 determines the order in which data is to be read from the data arrays and controls an array select multiplexer 125 accordingly. If the BXA0 signal is at a logic 1 value, data from the first data array 110 (AD0) is provided on the rising edge and data from the second data array 115 (AD1) is provided on the falling edge. Conversely, if the BXA0 signal is at a logic 0 value, data from the second data array 115 (AD1) is provided on the rising edge and data from the first data array 110 (AD0) is provided on the falling edge. The array select multiplexer 125 is described in greater detail below in reference to FIG. 3.

Data from the array select multiplexer 125, oriented in the manner described above, is received by a pipeline latch 130. The pipeline latch 130, which is described in greater detail below in reference to FIG. 3. captures multiple clock cycles worth of data from the data arrays 110, 115. The data stored in the pipeline latch 130 is received by an output latch 135, which, in turn, provides the data to a DQ buffer 140 where it may be read on the external pins (not shown) of the memory device 30. The output latch 135 is described in greater detail below in reference to FIG. 4.

Data provided by the DQ buffer 140 is synchronized with the external clock signal (XCLK), such that data is provided on the rising and falling edges of the XCLK signal after a predetermined amount of latency. In the illustrated embodiment, the latency may be set at 2, 2.5, or 3 clock cycles. Timing control logic 145 controls the operation of the pipeline latch 130 and the output latch 135 to synchronize the data with the XCLK signal. Collectively, the address command/control unit 105 and the timing control logic 145 may be referred to as control logic for regulating the operation of the memory device 30. It will be appreciated that the control logic may be implemented using one or more separate logic/control units.

A delay locked loop 150 receives the XCLK signal and delays the XCLK signal a programmable amount to generate a delayed clock signal (DLLCLK). The timing control logic 145 receives the XCLK signal and the DLLCLK signal, and generates control signals (MXD/MXQ) for the pipeline latch 130 and control signals (DLLR0/DLLF0) for the output latch 135 based thereon. The MXD signals are provided to the input enable terminals 151 of the pipe-line latch 130, and are based on an array access timing chain triggered by a read command received by the address/command control unit 105 and synchronized with the XCLK signal. The MXQ signals are provided to the output enable terminals 152 of the pipeline latch 130, and are based on the DLLCLK signal. The DLLR0/DLLF0 signals are provided to the output enable terminals 153 of the output latch 135, and are also based on the DLLCLK signal.

The DLLR0/DLLF0 signal is received by a DQ delay model 155. The DQ delay model 155 includes various logic gates (not shown) that mimic the operation of the DQ buffer 140 to provide a delay consistent with what might be seen therein. In the illustrated embodiment, the delay provided by the DQ delay model 155 is about 1.5 ns. The output of the DQ delay model 155 is provided as a feedback signal to the delay locked loop 150 for controlling the amount of programmable delay, thereby synchronizing the data in the DQ buffer 140 with the external clock signal (XCLK). An exemplary delay locked loop 150 is described in U.S. patent application Ser. No. 09/286,870, filed on Apr. 6, 1999 (now abandoned), entitled "DIGITAL DELAY LOCKED LOOP WITH NOISE FILTER," and incorporated by reference herein in its entirety.

Figure 3:
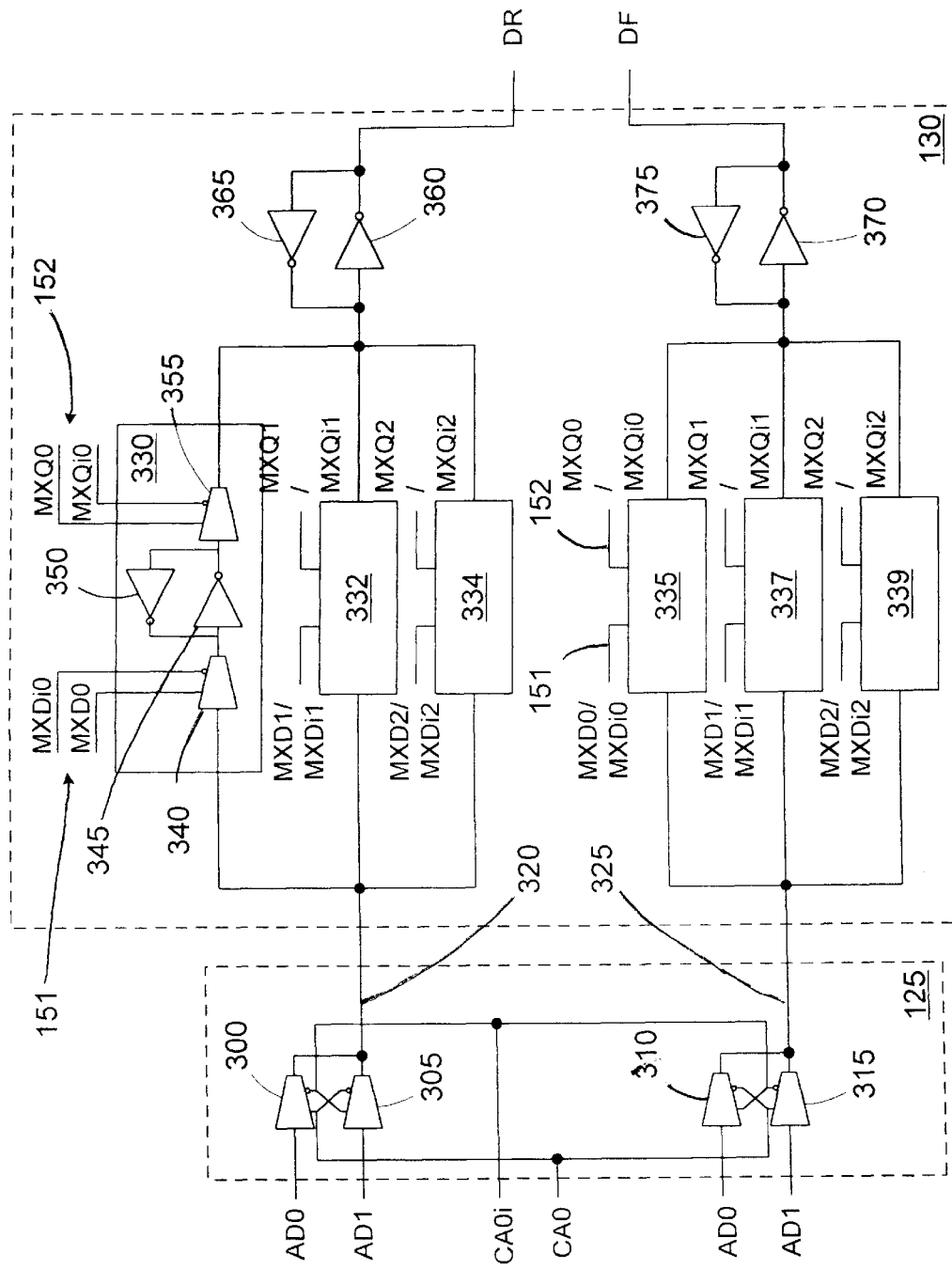
FIG. 3 is a simplified block diagram illustrating an array select multiplexer and a pipeline latch in the memory device of FIG. 2.

Turning now to FIG. 3, a simplified block diagram of the array select multiplexer 125 and the pipeline latch 130 is provided. The array select multiplexer 125 includes rising edge multiplexers 300, 305 that receive data from the data arrays 110, 115 (AD0, AD1), respectively. The array select multiplexer 125 also includes falling edge multiplexers 310, 315 that receive data from the data arrays 110, 115 (AD0, AD1), respectively.

The array select multiplexer 125 receives a control signal (CA0) and its compliment (CA0i) from the control unit 120. The CA0 signal corresponds to the LSB of the bank column address (BXA0). The CA0 and CA0i signals are coupled to the enable input terminals of the rising and falling edge multiplexers 300, 305, 310, 315. When the CA0 signal is at a logically high level, the rising edge multiplexer 300 and the falling edge multiplexer 315 are enabled, thus directing the data (AD0) from the first data array 110 to a rising edge path 320, and the data (AD1) from the second data array 115 to a falling edge path 325. Conversely, when the CA0 signal is at a logically low level, the rising edge multiplexer 305 and the falling edge multiplexer 310 are enabled, thus directing the data (AD1) from the second data array 115 to the rising edge path 320, and the data (AD0) from the first data array 110 to the falling edge path 325.

The pipeline latch 130 includes rising edge latches 330, 332, 334 coupled to the rising edge path 320 and falling edge latches 335, 337, 339 coupled to the falling edge path 325. Each latch 330, 332, 334, 335, 337, 339 receives input control signals (MXDn) and output control signals (MXQn) from the timing control logic 145. The latches 330, 332, 334 form a three-stage rising edge pipeline and the latches 335, 337, 339 form a three-stage falling edge pipeline. It is contemplated that more or less stages may be used, depending on the specific design requirements.

The components used to form the rising edge latch 330 are shown in detail. Each of the latches 330, 332, 334, 335, 337, 339 has a similar construction. The rising edge latch 330 includes an input multiplexer 340 coupled to the rising edge path 320. Two cross-coupled inverters 345, 350 form a latch, and the output terminal of the multiplexer 345 is coupled to an output multiplexer 355. The input multiplexer 340 receives the MXD0 control signal and its compliment, MXDi0 at its enable terminals 151. The output multiplexer 355 receives the MXQ0 control signal and its compliment, MXQi0 at its enable terminals 152. The output multiplexer 355 is coupled to cross-coupled inverters 360, 365. The other rising edge latches 332, 334 receive corresponding control signals MXDn/MXDin and MXQn/MXQin, and are also coupled to the cross-coupled inverters 360, 365. The falling edge latches 335, 337, 339 receive corresponding control signals MXDn/MXDin and MXQn/MXQin, and are coupled to two cross-coupled inverters 370, 375.

The output terminals of the cross-coupled inverters 360, 365, and 370, 375 represent rising edge data (DR) and falling edge data (DF). The timing of the pipeline latch 130 is discussed in greater detail below in reference to FIG. 5.

Figure 4:
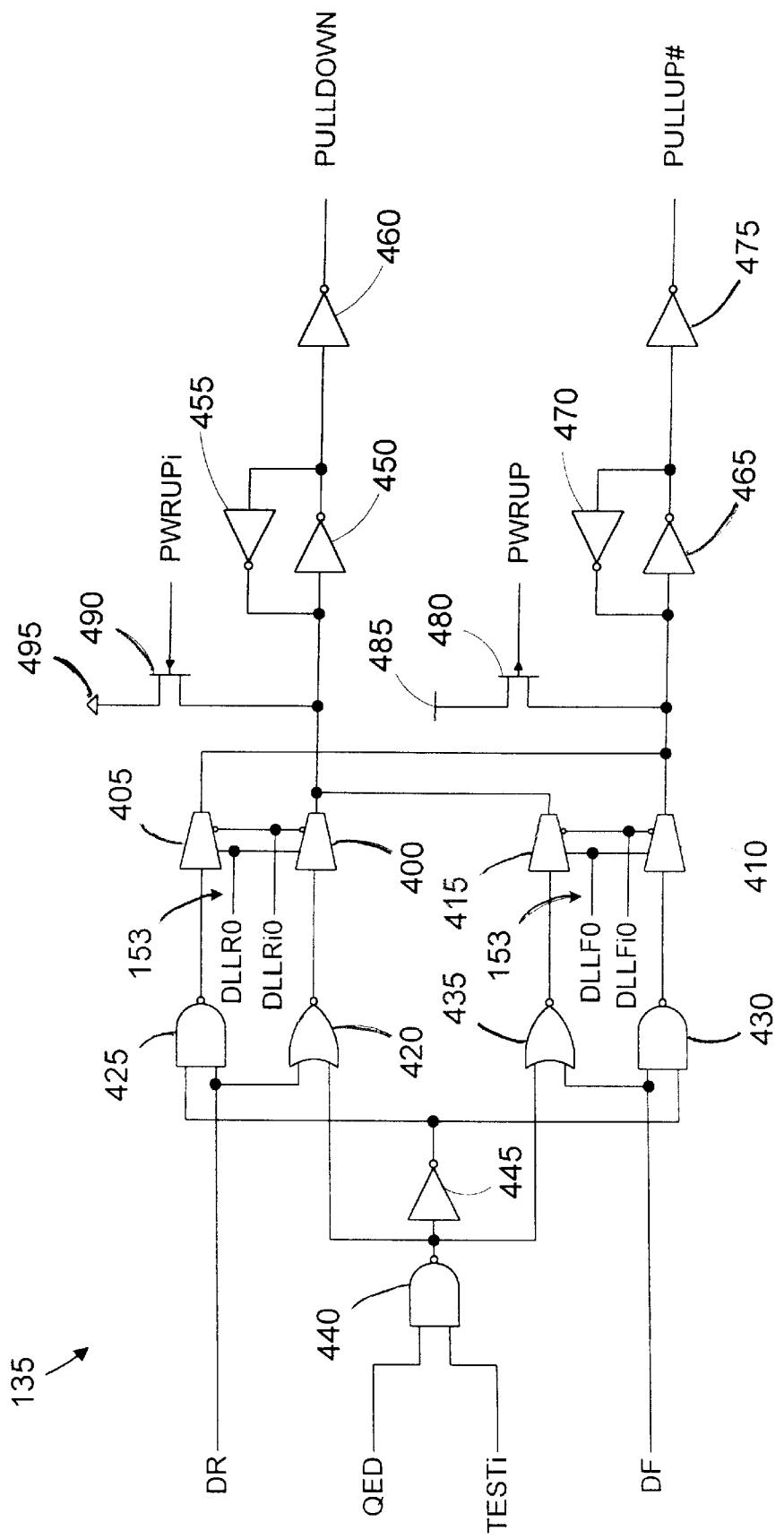
FIG. 4 is a simplified block diagram illustrating an output latch in the memory device of FIG. 2.

Referring to FIG. 4, a simplified block diagram of the output latch 135 is provided. The output latch 135 includes multiplexers 400, 405 associated with the rising edge path 320 (shown in FIG. 3) and multiplexers 410, 415 associated with the falling edge path 325 (shown in FIG. 3). The input to the multiplexer 400 is enabled by a NOR gate 420 and the input to the multiplexer 405 is enabled by a NAND gate 425. The input to the multiplexer 410 is enabled by a NAND gate 430 and the input to the multiplexer 415 is enabled by a NOR gate 435. A NAND gate 440 receives a test mode enable signal (TESTi) and an output enable signal (QED) as inputs, and is coupled to an inverter 445. The NAND gate 440 is also coupled to the NOR gates 420, 430, and the inverter 445 is coupled to the NAND gates 425, 435.

The NOR gate 420 and the NAND gate 425 are coupled to receive the rising edge data (DR) from the pipeline latch 130. The NAND gate 430 and the NOR gate 435 are coupled to receive the falling edge data (DF) from the pipeline latch 130. The output terminals of the multiplexers 400, 415 are coupled to cross-coupled inverters 450, 455. The inverters 450, 455 are coupled to an inverter 460 for driving the pull down device (not shown) of the DQ buffer 140 (i.e., designated by the signal PULLDOWN). The output terminals of the multiplexers 405, 410 are coupled to cross-coupled inverters 465, 470. The inverters 465, 470 are coupled to an inverter 475 for driving the pull up device (not shown) of the DQ buffer 140 (i.e., designated by the signal PULLUP#).

If either the QED signal or the TESTi signal is at a logically low level, the logic gates 420, 425 override the DR signal, and the logic gates 430, 435 override the DF signal. In such an override condition, the PULLDOWN signal is held at a logically low level and the PULLUP# signal is held at a logically high level causing the output of the DQ buffer 140 to be at a high impedance state. When both the QED and TESTi signals are at a logically high level, the values of the DR and DF signals control the respective multiplexers 400, 405, 410, 415 causing the DQ buffer 140 to drive the corresponding data on the output.

The output latch 135 also includes a p-type transistor 480 coupled between a voltage source 485 and the output terminal of the multiplexer 410. The p-type transistor 480 is controlled by a power present signal (PWRUP). During initialization of the memory device 30 before proper power levels have been achieved, the PWRUP signal is asserted at a logically low level to force the PULLUP# output to a known condition (i.e., logically high level). An n-type transistor 490 is coupled between a ground voltage source 495 and the output terminal of the multiplexer 400. The n-type transistor 490 is responsive to the compliment of the power present signal (PWRUPi) to force the PULLDOWN output to a known logic level (i.e., logically low level) when power is not present. Notice that the default levels (e.g., PULLDOWN=0, PULLUP#=1) when power is not present are consistent with the default levels provided when either of the QED and TESTi signals is at a logically low level. This default state of PULLUP# and PULLDOWN forces the DQ buffer 140 into a high impedance state.

The multiplexers 400, 405 are enabled by a delay locked loop rising edge signal (DLLR0) and its compliment (DLLRi0) at their respective enable terminals 153, and the multiplexers 410, 415 are enabled by a delay locked loop falling edge signal (DLLF0) and its compliment (DLLFi0) at their respective enable terminals 153. If the DLLR0 signal is asserted, the DR signal controls both the PULLDOWN and the PULLUP# output signals. Conversely, if the DLLF0 signal is asserted, the DF signal controls both the PULLDOWN and the PULLUP# output signals. The timing of the output latch 135 is described in greater detail below in reference to FIG. 5.

The logic configurations shown in FIGS. 3 and 4 are for illustrative purposes and do not limit the application of the invention. In light of this disclosure, other equivalent logic circuits may be developed to perform similar functions.

Figure 5:
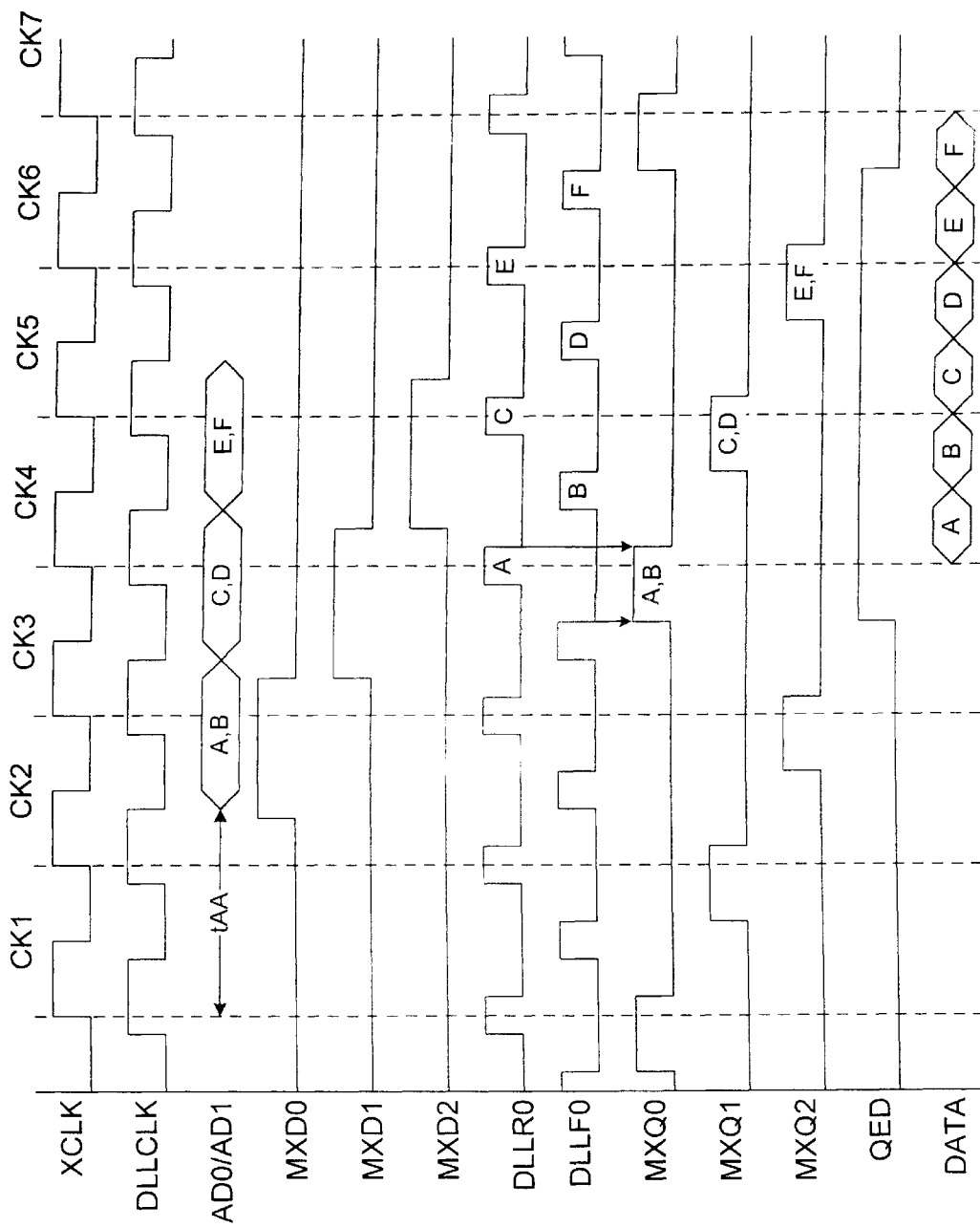
FIG. 5 is a timing diagram illustrating the operation of the memory device of FIG. 2.

Turning now to FIG. 5, a timing diagram illustrating the operation of the data output path 100 is provided. In the timing diagram illustrated by FIG. 5, the latency of the memory device 30 is 3 clock cycles, and the speed is about 7 ns. Although, for ease of illustration, certain transitions are shown and being described as being coincident, those of ordinary skill in the art will recognize that delays may be present between the transitions in an actual implementation due to inherent delays in the electronic components used to generate the signals.

The XCLK signal is synchronized with the DLLCLK signal. Because of the delay provided by the DQ delay model 155, the DLLCLK signal leads the XCLK signal by about 1.5 ns. In the illustrated embodiment, the access time of the data arrays 110, 115 (tAA) is about 11 ns. That is, it takes about 11 ns for data in the arrays 110, 115 to be available to the array select multiplexer 125 after a read command is registered coincident with the rising edge of the XCLK signal. In FIG. 5, clock cycles CK1 through CK7 represent cycles of the XCLK signal. Assume a read command is registered by the address/command control unit 105 on the rising edge of the cycle CK1. The data, denoted by A for the rising edge data (AD0 from the array select multiplexer 125), and B for the falling edge data (AD1 from the array select multiplexer 125) is available at the pipeline latch 130 about 11 ns later.

The MXD0 signal is asserted about 1 ns before the data is expected to be present (i.e., 10 ns after the command is registered) to ensure that the first stage rising and falling edge latches 330, 335 are opened (ie., input multiplexer 340 enabled) prior to the data being present. The MXD0 signal is deasserted about 1 ns before the next set of data (C,D) is available. Coincident with the deassertion of the MXD0 signal, the MXD1 signal is asserted to allow the C,D data to enter the second stage latches 332, 337. The MXD1 signal is deasserted about 1 ns before the next set of data (E,F) is available, and the MXD2 signal is asserted to allow the E,F data to enter the third stage latches 334, 339.

The timing control logic 145, generates the DLLR0 and DLLF0 signals based on the rising and falling edges of the DLLCLK signal, respectively. For clarity and ease of illustration, the DLLR0 signal is shown in phase alignment with the rising edge of the DLLCLK signal, and the DLLF0 is shown in phase alignment with the falling edge of the DLLCLK signal. In an actual implementation, delays inherent in the timing signal generator cause a delay between the DLLCLK signal and the respective DLLR0 and DLLF0 signals (e.g. about 3 ns). Because the output of the output latch 135 is synchronized with the DLLR0 signal, this inherent delay is immaterial.

In the illustrated embodiment, the latency of the memory device 30 is programmed at three clock cycles, and the data, A,B is output from the DQ buffer 140 on the cycle CK4, accordingly. On the falling edge of the DLLF0 signal prior to the cycle CK4, the MXQ0 signal is asserted to allow the data, A,B to exit the pipeline latch 130. The QED signal is asserted coincident with the MXQ0 signal to enable DR and DF signals to enter the output latch 135. The DLLR0 signal is asserted about 1.5 ns (i.e., due to the 1.5 ns delay provided by the DQ delay model 155) before the rising edge of the cycle CK4 to enable the output latch 135 and allow the A data to propagate through the DQ buffer 140. The MXQ0 signal is deasserted based on the falling edge of the DLLR0 signal to close the pipeline latch 130. The DLLF0 signal is asserted about 1.5 ns before the falling edge of the cycle CK4 to enable the output latch 135 and allow the B data to propagate through the DQ buffer 140.

If the latency were set an a non-integer number of clock cycles (e.g., 2.5 cycles), the MXQ0 signal would be generated starting at a falling edge of the DLLR0 signal and ending at a falling edge of the DLLF0 signal.

On the next falling edge of the DLLF0 signal, the MXQ1 signal is asserted to allow the C,D data to exit the pipeline latch 130 and enter the output latch 135. Again the DLLR0 and DLLF0 signals are asserted before the rising and falling edges of the cycle CK5 to output the C and D data. Then, the MXQ2 signal is asserted to allow the E,F data to exit the pipeline latch and enter the output latch 135. The C,D data is output from the output latch 135 on the DLLR0 and DLLF0 signals associated with the rising and falling edges of the cycle CK6.

The data output path 100 may be adapted for various speeds and latencies, because the control signals are generated based on edges of the XCLK and DLLCLK signals. Speeds and latencies may be changed without requiring re-design of the data output path 100.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A memory device, comprising:
a data array;
array control logic adapted to receive a read command synchronized with an external clock signal and to read at least a first data element from the data array based on the read command;
a delay locked loop circuit adapted to receive the external clock signal and delay the external clock signal by a programmable amount to generate a delay locked loop clock signal;
timing control logic adapted to generate a first input enable signal based on the external clock signal and a first output enable signal based on the delay locked loop clock signal; and
a first storage device adapted to receive the first data element, the first storage device having an input terminal enabled in response to the first input enable signal and an output terminal enabled in response to the first output enable signal.

2. The memory device of claim 1, further comprising:
an output buffer having a data output terminal and being coupled to the first storage device, the output buffer being adapted to receive the first data element and provide the first data element to the data output terminal synchronized with an edge of the external clock signal.

3. The memory device of claim 2, wherein the timing control logic is adapted to generate a rising edge signal based on a rising edge of the delay locked loop clock signal and a falling edge signal based on a falling edge of the delay locked loop clock signal, the timing control logic is adapted to generate an output buffer enable signal based on one of the rising edge signal and the falling edge signal, and the output buffer is adapted to receive the output buffer enable signal and enable the data output terminal based in response to the output buffer enable signal being asserted.

4. The memory device of claim 2, further comprising a second data array, wherein the array control logic is adapted to read a second data element from the second data array based on the read command, the first storage device is adapted to store the first and second data elements and the output buffer is adapted to provide the first and second data elements to the data output terminal synchronized with subsequent edges of the external clock signal.

5. The memory device of claim 4, wherein the first storage device includes a rising edge latch adapted to receive one of the first and second data elements and a falling edge latch adapted to receive the other of the first and second data elements.

6. The memory device of claim 5, further comprising an array select latch coupled between the first and second data arrays and the first storage device, the array select latch being adapted to provide one of the first and second data elements to the rising edge latch and the other of the first and second data elements to the falling edge latch based on the read command.

7. The memory device of claim 6, wherein the array control logic is adapted to generate a column address signal based on the read command and the array select latch is adapted to direct the first and second data elements to the rising and falling edge latches based on at least a portion of the column address signal.

8. The memory device of claim 5, further comprising an output latch coupled between the first storage device and the output buffer, wherein the timing control logic is adapted to generate a rising edge signal based on a rising edge of the delay locked loop clock signal and a falling edge signal based on a falling edge of the delay locked loop clock signal, and the output latch is adapted to provide the first data element to the output buffer based on the rising edge signal and the second data element to the output buffer based on the falling edge signal.

9. The memory device of claim 8, wherein the delay locked loop circuit is adapted to receive the rising edge signal and adjust the programmable delay amount to synchronize the rising edge signal with the external clock signal.

10. The memory device of claim 9, wherein an output delay amount is defined by the time taken to receive the first data element from the first storage device and provide the first data element to the data output terminal, and the memory device further includes:
 a delay model adapted to receive the rising edge signal, delay the rising edge signal by the output delay amount to generate a delayed rising edge signal, and provide the delayed rising edge signal to the delay locked loop circuit for synchronization with the external clock signal.

11. The memory device of claim 1, wherein the timing control logic is adapted to generate the first input enable signal a predetermined amount of time after the read command is registered by the array control logic.

12. The memory device of claim 5, wherein the timing control logic is adapted to generate a rising edge signal based on a rising edge of the delay locked loop clock signal generate a falling edge signal based on a falling edge of the delay locked loop clock signal, and generate the first output enable signal based on a falling edge of the falling edge signal and a falling edge of the rising edge signal.

13. The memory device of claim 12, wherein the timing signal generator is adapted to generate the first output enable signal based on the rising and falling edge signals and a programmable latency period after the read command.

14. The memory device of claim 1, wherein the first storage device includes a first input multiplexer enabled by the input enable signal, a first storage element coupled to the first input multiplexer, and a first output multiplexer enabled by the output enable signal.

15. The memory device of claim 14, wherein the first storage device includes a second storage element coupled to the first output multiplexer.

16. The memory device of claim 14, wherein the first storage element comprises first and second cross-coupled inverters.

17. The memory device of claim 1, wherein the array control logic is further adapted to read a plurality of data elements on subsequent clock cycles of the external clock signal, and the first storage device includes a plurality of stages, each stage being adapted to store one of the plurality of data elements.

18. The memory device of claim 17, wherein the first storage device includes at least three stages.

19. A computer system, comprising:
 a microprocessor adapted to issue a read request synchronized with an external clock signal;
 a memory device adapted to receive the external clock signal and the read request, the memory device comprising:
  a data array;
  array control logic adapted to receive a read command synchronized with the external clock signal and to read at least a first data element from the data array based on the read command;
  a delay locked loop circuit adapted to receive the external clock signal and delay the external clock signal by a programmable amount to generate a delay locked loop clock signal;
  timing control logic adapted to generate a first input enable signal based on the external clock signal and a first output enable signal based on the delay locked loop clock signal; and
  a first storage device adapted to receive the first data element, the first storage device having a latch input terminal enabled in response to the first input enable signal and a latch output terminal enabled in response to the first output enable signal.

20. The computer system of claim 19, the memory device further comprising:
 an output buffer having a data output terminal and being coupled to the first storage device, the output buffer being adapted to receive the first data element and provide the first data element to the data output terminal synchronized with an edge of the external clock signal.

21. The computer system of claim 20, the memory device further comprising a second data array, wherein the array control logic is adapted to read a second data element from the second data array based on the read command, the first storage device is adapted to store the first and second data elements, and the output buffer is adapted to provide the first and second data elements to the data output terminal synchronized with subsequent edges of the external clock signal.

22. The computer system of claim 21, wherein the first storage device includes a rising edge latch adapted to receive one of the first and second data elements and a falling edge latch adapted to receive the other of the first and second data elements.

23. The computer system of claim 22, the memory device further comprising an array select latch coupled between the first and second data arrays and the first storage device, the array select latch being adapted to provide one of the first and second data elements to the rising edge latch and the other of the first and second data elements to the falling edge latch based on the read command.

24. The computer system of claim 23, wherein the array control logic is adapted to generate a column address signal based on the read command and the array select latch is adapted to direct the first and second data elements to the rising and falling edge latches based on at least a portion of the column address signal.

25. The computer system of claim 22, the memory device further comprising an output latch coupled between the first storage device and the output buffer, wherein the timing control logic is adapted to generate a rising edge signal based on a rising edge of the delay locked loop clock signal and a falling edge signal based on a falling edge of the delay locked loop clock signal and the output latch is adapted to provide the first data element to the output buffer based on the rising edge signal and the second data element to the output buffer based on the falling edge signal.

26. The computer system of claim 25, wherein the delay locked loop circuit is adapted to receive the rising edge signal and adjust the programmable delay amount to synchronize the rising edge signal with the external clock signal.

27. The computer system of claim 26, wherein an output delay amount is defined by the time taken to receive the first data element from the first storage device and provide the first data element to the data output terminal, and the memory device further includes:
 a delay model adapted to receive the rising edge signal, delay the rising edge signal by the output delay amount to generate a delayed rising edge signal, and provide the delayed rising edge signal to the delay locked loop circuit for synchronization with the external clock signal.

28. The computer system of claim 19, wherein the timing control logic is adapted to generate the first input enable signal a predetermined amount of time after the read command is registered by the array control logic.

29. The computer system of claim 22, wherein the timing control logic is adapted to generate a rising edge signal based on a rising edge of the delay locked loop clock signal, generate a falling edge signal based on a falling edge of the delay locked loop clock signal, and generate the first output enable signal based on a falling edge of the falling edge signal and a falling edge of the rising edge signal.

30. The computer system of claim 29, wherein the timing signal generator is adapted to generate the first output enable signal based on the rising and falling edge signals and a programmable latency period after the read command.

31. The computer system of claim 19, wherein the first storage device includes a first input multiplexer enabled by the input enable signal, a first storage element coupled to the first input multiplexer, and a first output multiplexer enabled by the output enable signal.

32. The computer system of claim 31, wherein the first storage device includes a second storage element coupled to the first output multiplexer.

33. The computer system of claim 31, wherein the first storage element comprises first and second cross-coupled inverters.

34. The computer system of claim 19, wherein the array control logic is further adapted to read a plurality of data elements on subsequent clock cycles of the external clock signal, and the first storage device includes a plurality of stages, each stage being adapted to tore one of the plurality of data elements.

35. A method for accessing a memory device, comprising:
receiving a read command synchronized with an external clock signal;
accessing a data array to read at least a first data element from the data array based on the read command;
delaying the external clock signal by a programmable amount to generate a delay locked loop clock signal;
generating a first input enable signal based on the external clock signal and a first output enable signal based on the delay locked loop clock signal; and
storing the first data element in a first data storage device in response to the first input enable signal and outputting the first data element from the first data storage device in response to the first output enable signal.

36. The method of claim 35, further comprising providing the first data element to a data output terminal synchronized with an edge of the external clock signal.

37. The method of claim 36, further comprising:
reading a second data element from a second data array based on the read command;
storing the first and second data elements in the first data storage device; and
providing the first and second data elements to the data output terminal synchronized with subsequent edges of the external clock signal.

38. The method of claim 37, wherein storing the first and second data elements includes:
storing one of the first and second data elements in a rising edge latch of the first data storage device; and
storing the other of the first and second data elements in a falling edge latch of the first data storage device.

39. The method of claim 38, further comprising providing one of the first and second data elements to the rising edge latch and the other of the first and second data elements to the falling edge latch based on the read command.

40. The method of claim 39, further comprising:
generating a column address signal based on the read command, and
directing the first and second data elements to the rising and falling edge latches based on at least a portion of the column address signal.

41. The method of claim 38, further comprising:
generating a rising edge signal based on a rising edge of the delay locked loop clock signal and a falling edge signal based on a falling edge of the delay locked loop clock signal; and
providing the first data element to the data output terminal based on the rising edge signal and the second data element to the data output terminal based on the falling edge signal.

42. The method of claim 41, wherein delaying the external clock signal includes:
receiving the rising edge signal; and
adjusting the programmable delay amount to synchronize the rising edge signal with the external clock signal.

43. The method of claim 42, wherein an output delay amount is defined by the time taken to receive the first data element from the first data storage device and provide the first data element to the data output terminal, and delaying the external clock signal includes:
delaying the rising edge signal by the output delay amount to generate a delayed rising edge signal; and
adjusting the programmable delay amount to synchronize the delayed rising edge signal with the external clock signal.

44. The method of claim 35, generating the first input enable signal includes generating the first input enable signal a predetermined amount of time after the read command is received.

45. The method of claim 36, wherein generating the output enable signals includes:
generating a rising edge signal based on a rising edge of the delay locked loop clock signal;
generating a falling edge signal based on a falling edge of the delay locked loop clock signal; and
generating the first output enable signal based on a falling edge of the falling edge signal and a falling edge of the rising edge signal.

46. The method of claim 45, wherein generating the first output enable signal includes generating the first output enable signal based on the rising and falling edge signals and a programmable latency period after the read command.

47. The method of claim 35, further comprising:
reading a plurality of data elements on subsequent clock cycles of the external clock signal; and
storing the plurality of data elements in a plurality of stages in the first data storage element.

48. A method for synchronizing a data transfer, comprising:
receiving a first data element synchronized with an external clock signal;
delaying the external clock signal by a programmable amount to generate a delay locked loop clock signal;
generating a first input enable signal based on the external clock signal and a first output enable signal based on the delay locked loop clock signal; and storing the first data element in a first data storage device in response to the first input enable signal and outputting the first data element from the first data storage device in response to the first output enable signal.

49. The method of claim 48, further comprising providing the first data element to a data output terminal synchronized with an edge of the external clock signal.

50. The method of claim 49, further comprising:

receiving a second data element in parallel with the first data element;

storing the first and second data elements in the first data storage device; and providing the first and second data elements to the data output terminal synchronized with subsequent edges of the external clock signal.

51. The method of claim 50, wherein storing the first and second data elements includes:

storing one of the first and second data elements in a rising edge latch of the first data storage device; and storing the other of the first and second data elements in a falling edge latch of the first data storage device.

52. The method of claim 51, further comprising:

generating a rising edge signal based on a rising edge of the delay locked loop clock signal and a falling edge signal based on a falling edge of the delay locked loop clock signal; and providing the first data element to the data output terminal based on the rising edge signal and the second data element to the data output terminal based on the falling edge signal.

53. The method of claim 52, wherein delaying the external clock signal includes:

receiving the rising edge signal; and adjusting the programmable delay amount to synchronize the rising edge signal with the external clock signal.

54. The method of claim 53, wherein an output delay amount is defined by the time taken to receive the first data element from the first data storage device and provide the first data element to the data output terminal, and delaying the external clock signal includes:

delaying the rising edge signal by the output delay amount to generate a delayed rising edge signal; and adjusting the programmable delay amount to synchronize the delayed rising edge signal with the external clock signal.

55. The method of claim 48, generating the first input enable signal includes generating the first input enable signal a predetermined amount of time after the read command is received.

56. The method of claim 51, wherein generating the output enable signals includes:

generating a rising edge signal based on a rising edge of the delay locked loop clock signal;

generating a falling edge signal based on a falling edge of the delay locked loop clock signal; and generating the first output enable signal based on a falling edge of the falling edge signal and a falling edge of the rising edge signal.

57. The method of claim 56, wherein generating the first output enable signal includes generating the first output enable signal based on the rising and falling edge signals and a programmable latency period after the read command.

58. The method of claim 48, further comprising:

receiving a plurality of data elements on subsequent clock cycles of the external clock signal; and storing the plurality of data elements in a plurality of stages in the first data storage element.

59. A memory device, comprising:

means for receiving a read command synchronized with an external clock signal;

means for receiving at least a first data element based on the read command;

means for delaying the external clock signal by a programmable amount to generate a delay locked loop clock signal;

means for generating a first input enable signal based on the external clock signal and a first output enable signal based on the delay locked loop clock signal; and means for storing the first data element in response to the first input enable signal and outputting the first data element from the first data storage device in response to the first output enable signal.

60. The computer system of claim 20, wherein the timing control logic is adapted to generate a rising edge signal based on a rising edge of the delay locked loop clock signal and a falling edge signal based on a falling edge of the delay locked loop clock signal, the timing control logic is adapted to generate an output buffer enable signal based on one of the rising edge signal and the falling edge signal, and the output buffer is adapted to receive the output buffer enable signal and enable the data output terminal in response to the output buffer enable signal being asserted.

61. The method of claim 36, further comprising:

generating a rising edge signal based on a rising edge of the delay locked loop clock signal;

generating a falling edge signal based on a falling edge of the delay locked loop clock signal;

generating an output buffer enable signal based on one of the rising edge signal and the falling edge signal; and enabling the data output terminal in response to the output buffer enable signal being asserted.

62. The method of claim 49, further comprising:

generating a rising edge signal based on a rising edge of the delay locked loop clock signal;

generating a falling edge signal based on a falling edge of the delay locked loop clock signal;

generating an output buffer enable signal ba,ed on one of the rising edge signal and the falling edge signal; and enabling the data output terminal in response to the output buffer enable signal being in asserted.

* * * * *

UNITED STATES PATENT AND TRADEMARK OFFICE
CERTIFICATE OF CORRECTION

PATENT NO.   : 6,446,180 B2                                                  Page 1 of 1
DATED        : September 3, 2002
INVENTOR(S)  : Li et al.

It is certified that error appears in the above-identified patent and that said Letters Patent is hereby corrected as shown below:

Column 1,
Line 34, delete "tore" and insert -- store --

Column 2,
Line 52, delete "ba,ed" and insert -- based --

Signed and Sealed this

Eleventh Day of February, 2003

JAMES E. ROGAN
*Director of the United States Patent and Trademark Office*